(12) United States Patent
Yezerets et al.

(10) Patent No.: US 7,562,523 B2
(45) Date of Patent: Jul. 21, 2009

(54) APPARATUS, SYSTEM, AND METHOD FOR DETERMINING A REGENERATION CYCLE THERMAL RAMP

(75) Inventors: Aleksey Yezerets, Columbus, IN (US);
Neal W. Currier, Columbus, IN (US);
Arvind Suresh, Columbus, IN (US);
William S. Epling, Waterloo (CA)

(73) Assignee: Cummins, Inc, Columbus, IN (US)

( * ) Notice: Subject to any disclaimer, the term of this patent is extended or adjusted under 35 U.S.C. 154(b) by 131 days.

(21) Appl. No.: 11/301,693

(22) Filed: Dec. 13, 2005

(65) Prior Publication Data

US 2007/0130921 A1 Jun. 14, 2007

(51) Int. Cl.
*F01N 3/00* (2006.01)
(52) U.S. Cl. .............. 60/295; 60/274; 60/286; 60/297; 60/303; 60/311
(58) Field of Classification Search ............ 60/274, 60/278, 280, 286, 295, 297, 303, 311
See application file for complete search history.

(56) References Cited

U.S. PATENT DOCUMENTS

| | | | |
|---|---|---|---|
| 6,405,528 B1 * | 6/2002 | Christen et al. | ............... 60/295 |
| 6,634,170 B2 | 10/2003 | Hiranuma et al. | |
| 6,805,095 B2 | 10/2004 | Sun et al. | |
| 6,820,418 B2 | 11/2004 | Nakatani et al. | |
| 6,829,890 B2 * | 12/2004 | Gui et al. | ............... 60/295 |
| 6,862,927 B2 * | 3/2005 | Craig et al. | ............... 73/118.1 |
| 6,941,750 B2 | 9/2005 | Boretto et al. | |
| 7,054,734 B2 * | 5/2006 | Todoroki et al. | ............ 701/105 |
| 7,111,455 B2 | 9/2006 | Okugawa et al. | |
| 7,254,940 B2 * | 8/2007 | Saitoh et al. | ................ 60/295 |
| 7,264,642 B2 | 9/2007 | Hamahata et al. | |
| 7,275,365 B2 * | 10/2007 | Zhan et al. | ............... 60/295 |

OTHER PUBLICATIONS

PCT International Search Report and Written Opinion, May 6, 2008.

* cited by examiner

*Primary Examiner*—Binh Q. Tran
(74) *Attorney, Agent, or Firm*—Kunzler & McKenzie

(57) ABSTRACT

An apparatus, system, and method are disclosed for determining a regeneration cycle thermal ramp. A thermal ramp module estimates a regeneration cycle thermal ramp. A soot content module estimates a soot content for a filter. In one embodiment, an oxygen content module estimates an oxygen gas concentration for the filter. A thermal profile module calculates a thermal profile for the filter as a function of the soot content and the thermal ramp. The thermal profile module may also include the oxygen content in the thermal profile calculation. A test module modifies the regeneration cycle thermal ramp if the thermal profile exceeds a thermal threshold. In one embodiment, a communication module may communicate a warning if the thermal ramp exceeds a warning threshold.

20 Claims, 9 Drawing Sheets

APPARATUS, SYSTEM, AND METHOD FOR DETERMINING A REGENERATION CYCLE THERMAL RAMP

FIELD OF THE INVENTION

This invention relates to particulate filter regeneration and more particularly relates to determining a regeneration cycle thermal ramp for a particulate filter.

DESCRIPTION OF THE RELATED ART

Environmental concerns have motivated the implementation of emission requirements for internal combustion engines throughout much of the world. Generally, emission requirements vary according to engine type. Emission tests for compression-ignition or diesel engines typically monitor the release of diesel particulate matter, nitrogen oxides, hydrocarbons, and carbon monoxide. Catalytic converters implemented in an exhaust gas after-treatment system have been used to eliminate many of the pollutants present in exhaust gas. However, to remove diesel particulate matter, a diesel particulate filter, herein referred to as a filter, must often be installed downstream or upstream from a catalytic converter, or in conjunction with a catalytic converter.

A typical filter comprises a porous ceramic substrate with parallel passageways through which exhaust gas passes. Particulate matter accumulates on the surface of the filter, creating a buildup that obstructs the flow of exhaust gas. The particulate obstruction creates a back pressure that can impair engine performance. Sufficient back pressure may prevent the engine from achieving a rated performance by the limiting the exhaust flow.

Various conditions, including, but not limited to, engine operating conditions, mileage, driving style, terrain, etc., affect the rate at which particulate matter accumulates within a diesel particulate filter. Common forms of particulate matter are ash and soot. Ash, typically a residue of burnt engine oil, is substantially incombustible and builds slowly within the filter. Soot, chiefly composed of carbon, can be oxidized and driven off of the filter in an event called regeneration. The filter may be periodically regenerated to drive off soot, reduce the particulate matter in the filter, and prevent the back pressure from impairing engine performance.

To regenerate or oxidize the accumulated soot, filter temperatures generally must exceed the temperatures typically found in the diesel exhaust. Consequently, additional methods to initiate regeneration of a diesel particulate filter must be used. In one method, a reactant, such as diesel fuel, is introduced into an exhaust after-treatment system and oxidized at a filter and/or a catalyst located upstream of the filter to generate higher temperatures and initiate oxidation of soot in the filter. Partial or complete regeneration may occur depending on the duration of time the filter is exposed to elevated temperatures and the amount of soot remaining on the filter.

Unfortunately, if the oxidation of soot during regeneration is too rapid, the heat generated may further significantly increase oxidation leading to thermal runaway. Thermal runaway may be caused by too rapid a temperature ramp during regeneration and/or too much soot in the filter. During thermal runaway, the temperature in the filter may increase enough to melt the substrate and/or damage the filter, and/or catalytic material coated on the filter. If thermal runaway occurs, the filter must typically be replaced at a high cost.

From the foregoing discussion, it should be apparent that a need exists for an apparatus, system, and method that determine a regeneration cycle thermal ramp for a filter. Beneficially, such an apparatus, system, and method would reduce filter damage caused by thermal runaway.

SUMMARY OF THE INVENTION

The present invention has been developed in response to the present state of the art, and in particular, in response to the problems and needs in the art that have not yet been fully solved by currently available temperature ramp determination methods. Accordingly, the present invention has been developed to provide an apparatus, system, and method for determining a regeneration cycle thermal ramp that overcome many or all of the above-discussed shortcomings in the art.

The apparatus to determine a regeneration cycle thermal ramp is provided with a plurality of modules configured to functionally execute the necessary steps of estimating a regeneration cycle thermal ramp, estimating a soot content for a filter, calculating a thermal profile for the filter, and modifying the regeneration cycle thermal ramp if the thermal profile exceeds a thermal threshold. These modules in the described embodiments include a thermal ramp module, a soot content module, a thermal profile module, and a test module. In one embodiment, the apparatus further comprises an oxygen content module.

The thermal ramp module estimates a regeneration cycle thermal ramp. In one embodiment, the thermal ramp module estimates a predetermined regeneration cycle thermal ramp. In an alternate embodiment, the thermal ramp module estimates the regeneration cycle thermal ramp as equivalent to a stored regeneration cycle thermal ramp.

The soot content module estimates a soot content for a filter. In one embodiment, the soot content module estimates the soot content as a function of one or more engine parameters. For example, the soot content module may estimate the soot content as a fuel consumption parameter multiplied by a constant.

In one embodiment, the oxygen content module estimates an oxygen content for the filter. The thermal profile module calculates a thermal profile for the filter as a function of the soot content and the thermal ramp. The thermal profile module may also include the oxygen content in the thermal profile calculation. The thermal profile may be configured in the form of a heat evolution rate. Alternatively, the thermal profile may be configured in the form of a soot oxidation rate.

The test module modifies the regeneration cycle thermal ramp if the thermal profile exceeds a thermal threshold. For example, if the thermal threshold is configured as a soot oxidation rate of 0.5 grams of soot oxidized per liter of filter per minute (0.5 g/l/min), and the thermal profile module is calculated as exceeding 0.6 g/l/min, the test module modifies the regeneration cycle thermal ramp to reduce the thermal profile. The apparatus determines a regeneration cycle thermal ramp that avoids thermal runaway.

A system of the present invention is also presented to determine a regeneration cycle thermal ramp. The system may be embodied in an exhaust gas after-treatment system of a diesel engine. In particular, the system, in one embodiment, includes a filter and a controller comprising a thermal ramp module, a soot content module, a thermal profile module, a test module, and a communication module.

The filter is configured to trap particulates from an exhaust gas. In one embodiment, the exhaust gas is from the exhaust gas after-treatment system of the diesel engine. The particulates may include a substantially incombustible ash and a substantially combustible soot. In one embodiment, the system includes a regeneration device. The regeneration device may regenerate the filter by injecting a reactant such as diesel fuel into the exhaust gas. The reactant may combust the soot in the filter, reducing the soot accumulation in the filter.

The controller module may control one or more engine functions including regenerating the filter. In addition, the controller module may execute one or more processes comprising the thermal ramp module, soot content module, thermal profile module, test module, and communication module. The thermal ramp module estimates a regeneration cycle thermal ramp. The soot content module estimates a soot content for the filter. The thermal profile module calculates a thermal profile for the filter as a function of the soot content and the thermal ramp. The test module modifies the regeneration cycle thermal ramp if the thermal profile exceeds a thermal threshold. The communication module communicates a warning if the thermal ramp exceeds a warning threshold. The system determines a filter regeneration cycle thermal ramp that avoids damage to the filter.

A method of the present invention is also presented for determining a regeneration cycle thermal ramp. The method in the disclosed embodiments substantially includes the steps necessary to carry out the functions presented above with respect to the operation of the described apparatus and system. In one embodiment, the method includes estimating a regeneration cycle thermal ramp, estimating a soot content for a filter, calculating a thermal profile for the filter, and modifying the regeneration cycle thermal ramp if the thermal profile exceeds a thermal threshold.

A thermal ramp module estimates a regeneration cycle thermal ramp. A soot content module estimates a soot content for a filter. In one embodiment, an oxygen content module estimates an oxygen content for the filter. A thermal profile module calculates a thermal profile for the filter as a function of the soot content and the thermal ramp. The thermal profile module may also include the oxygen content in the thermal profile calculation. A test module modifies the regeneration cycle thermal ramp if the thermal profile exceeds a thermal threshold. In one embodiment, a communication module may communicate a warning if the thermal ramp exceeds a warning threshold.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention determines a regeneration cycle thermal ramp for a filter. In addition, the embodiment of the present invention may prevent damage to the filter during regeneration from thermal runaway. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
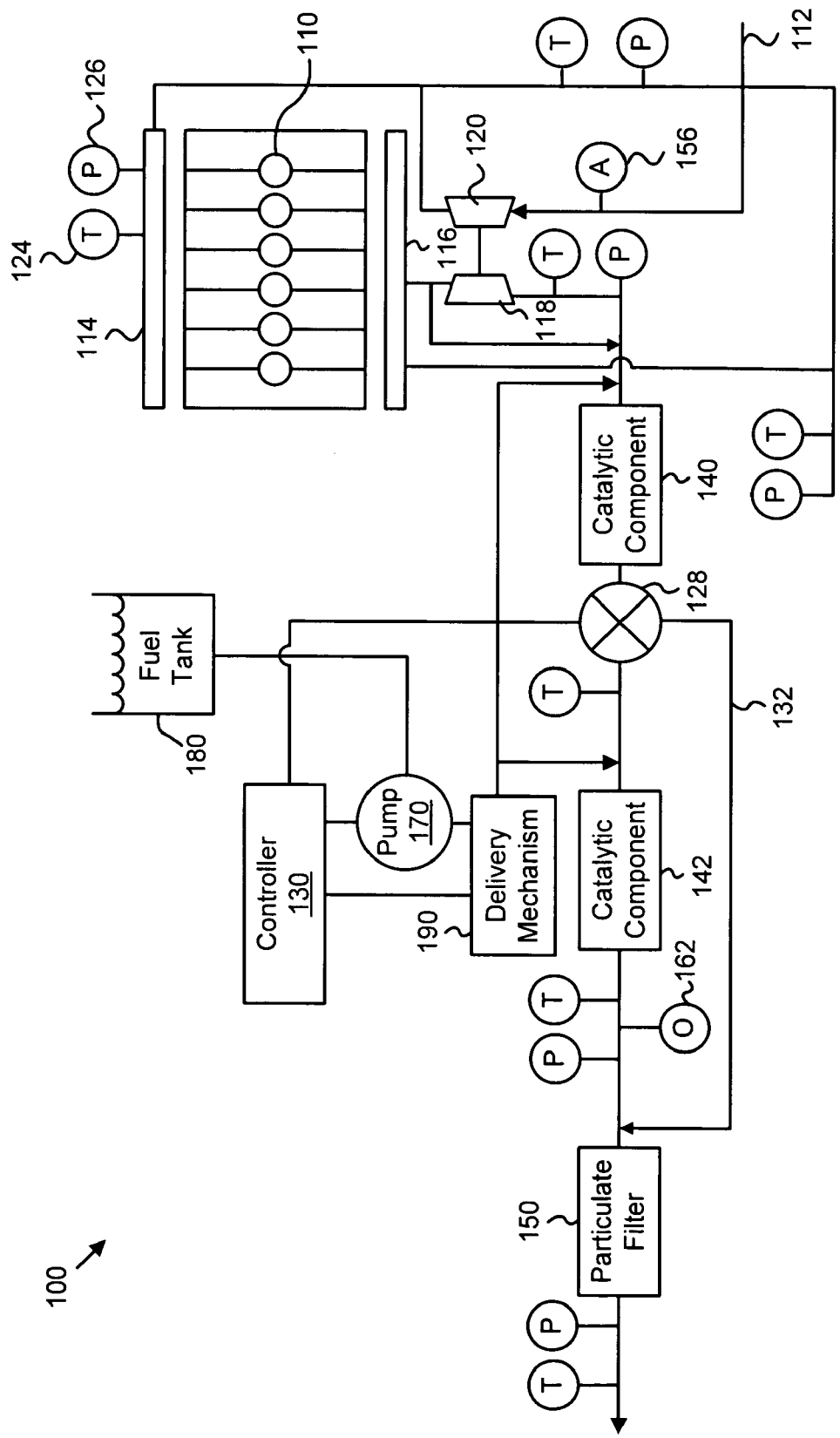
FIG. 1 is a schematic block diagram illustrating one embodiment of an exhaust gas after-treatment system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. In addition, modules may also be embodied as a mechanical device configured to perform an analog computation by measuring a physical change in configuration in response to mechanical inputs.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, electrical or mechanical analog computational elements, or other processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an exhaust gas after-treatment system 100 in accordance with the present invention. The exhaust gas after-treatment system 100 may be implemented in conjunction with an internal combustion engine 110 to remove various chemical compounds and particulates from emitted exhaust gas. As illustrated, the exhaust gas after-treatment system 100 may include an internal combustion engine 110, controller 130, catalytic components 140, 142, filter 150, reactant pump 170, fuel tank 180, and reductant delivery mechanism 190. Exhaust gas treated in the exhaust gas after-treatment system 100 and released into the atmosphere consequently contains significantly fewer pollutants, such as diesel particulate matter, nitrogen oxides, hydrocarbons, and carbon monoxide than untreated exhaust gas.

The exhaust gas after-treatment system 100 may further include an air inlet 112, intake manifold 114, exhaust manifold 116, turbocharger turbine 118, turbocharger compressor 120, temperature sensors 124, pressure sensors 126, air-flow sensors 156, and exhaust gas system valve 128. In a certain embodiment the system 100 includes an oxygen sensor 162. In one embodiment, the air inlet 112 vented to the atmosphere enables air to enter the exhaust gas after-treatment system 100. The air inlet 112 may be connected to an inlet of the intake manifold 114. The intake manifold 114 includes an outlet operatively coupled to the compression chamber of the internal combustion engine 110.

Within the internal combustion engine 110, compressed air from the atmosphere is combined with fuel to power the engine 110. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 is directed to the inlet of the exhaust gas after-treatment system valve 128. The exhaust gas may pass through one or more catalytic components 140, 142 and/or filters 150 in order to reduce the number of pollutants contained in the exhaust gas before venting the exhaust gas into the atmosphere. Another portion of the exhaust gas may be re-circulated to the engine 110.

Exhaust gas directed to the exhaust gas after-treatment system valve 128 may pass through the first catalytic component 140, such as a hydrocarbon oxidation catalyst or the like, in certain embodiments. Various sensors, such as temperature sensors 124, pressure sensors 126, and the like, may be disposed throughout the exhaust gas after-treatment system 100 and may be in communication with the controller 130 to monitor operating conditions.

The exhaust gas after-treatment system valve 128 may direct the exhaust gas to the inlet of a second catalytic component 142, such as a nitrogen oxide adsorption catalyst or the like. Alternatively or in addition, a portion of the exhaust gas may be diverted through the system valve 128 to an exhaust bypass 132. The exhaust gas bypass 132 may have an outlet operatively linked to the inlet of the filter 150, which may comprise a particulate filter in certain embodiments. Particulate matter in the exhaust gas, such as soot and ash, may be retained within the filter 150. The exhaust gas may subsequently be vented to the atmosphere.

In addition to filtering the exhaust gas, the exhaust gas after-treatment system 100 may include a system for regenerating the filter 150. The regeneration system may introduce a reactant, such as fuel, into the exhaust gas or into components of the exhaust gas after-treatment system 100. The reactant may facilitate the regeneration of the filter. The fuel tank 180, in one embodiment, may be connected to the reactant pump 170. The pump 170, under direction of the controller 130, may provide fuel or the like to a reactant delivery mechanism 190, such as a nozzle, to the catalytic components 140, 142. The controller 130 may direct the exhaust valve 128, reactant pump 170, and reactant delivery mechanism 190 to create an environment conducive to combustion of soot.

One method to regenerate the filter 150, according to one embodiment, comprises periodically introducing reactant into the exhaust gas. The controller 130 directs the reactant pump 170 to deliver reactant to the reactant delivery mechanism 190. The controller 130 subsequently regulates the delivery mechanism 190 to deliver selected amounts of reactant into the exhaust gas, the exhaust gas passing through the filter. After each injection of reactant, the delivery mechanism 190 may be closed and no additional reactant is delivered directly to the exhaust gas. The effect of this sequence produces a series of injections of reactant upstream of the inlet of the filter 150 that ramp the temperature of the filter 150. As a result, the controller 130 may control the regeneration of the filter 150. In the past, the controller 130 has rapidly introduced reactant and rapidly increased the temperature of the filter to minimize the reactant required for regeneration.

In certain embodiments, the exhaust gas after-treatment system 100 may be configured to determine an appropriate rate to introduce reactant into the exhaust gas. The rate at which reactant is introduced affects the rate at which the temperature rises with the filter 150 or the regeneration cycle thermal ramp. An increased reactant introduction rate increases the regeneration cycle thermal ramp while a decreased reactant introduction rate decreases the regeneration cycle thermal ramp.

Unfortunately, if the regeneration cycle thermal ramp increases the temperature within the filter 150 too quickly, soot in the filter 150 may oxidize too rapidly, further increasing the temperature and the rate of soot oxidation and causing thermal runaway. During thermal runaway, the temperature within the filter 150 may rise sufficiently high to damage the filter 150. The embodiment of the present invention determines an upper limit on a regeneration cycle thermal ramp for regenerating the filter 150 that may prevent thermal runaway and protect against damage to the filter 150.

Figure 2:
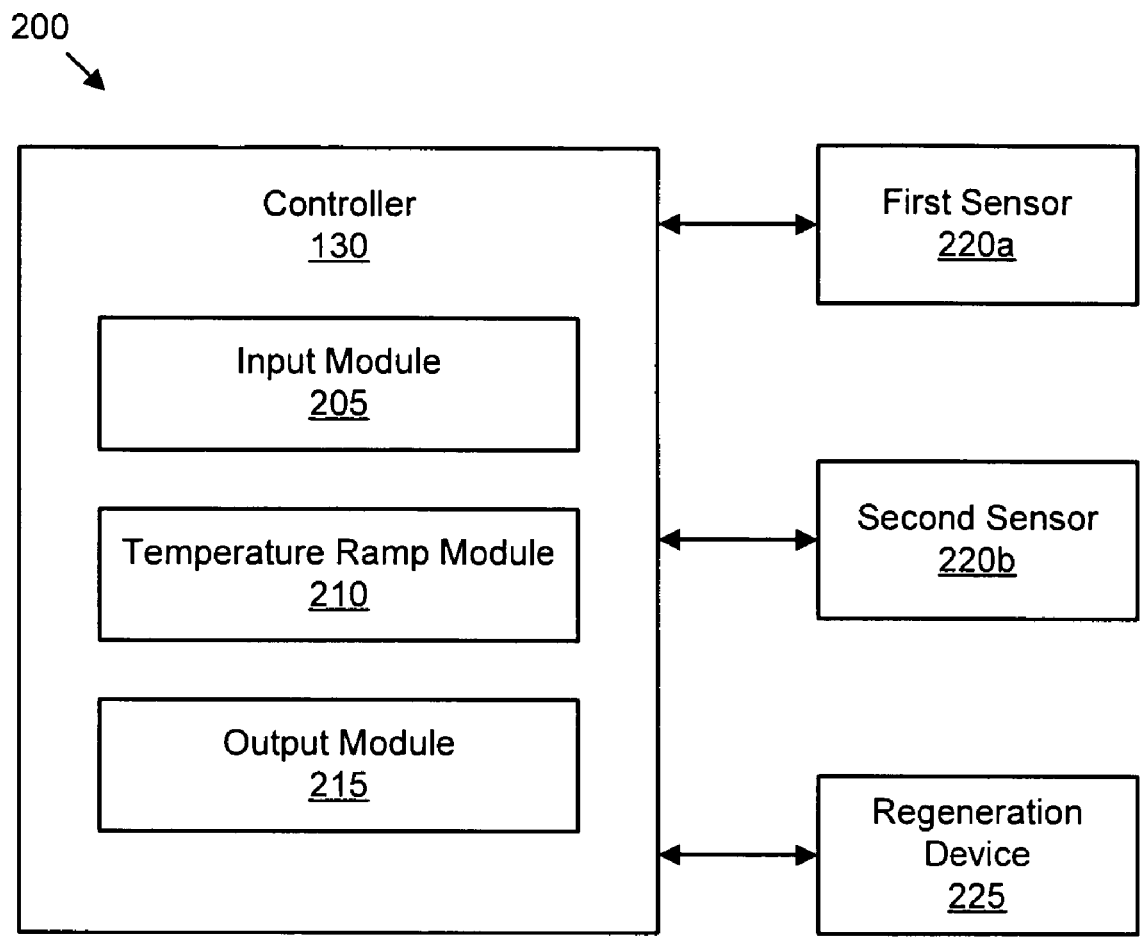
FIG. 2 is a schematic block diagram illustrating one embodiment of a control system of the present invention.

FIG. 2 illustrates one embodiment of a control system 200 in accordance with the present invention. As depicted, the system 200 may include a controller 130, one or more sensors 220, and a regeneration device 225. The controller 130 may include an input module 205, temperature ramp module 210, and output module 215. In addition, FIG. 2 may refer to one or more elements of FIG. 1, like numbers referring to like elements.

The controller 130 is the controller 130 of FIG. 1. The input module 205 of the controller 130 may receive input from the sensors 220. The sensors 220 may be the temperature sensors 124, pressure sensors 126, air-flow sensors 156, and oxygen sensor 162 of FIG. 1.

In one embodiment, the first sensor 220a is a pressure sensor that determines a pressure across the filter 150 of FIG. 1. The first sensor module 220a may calculate the pressure across the filter 150 as the difference in pressure between a first and second pressure sensor. In an alternate embodiment, the first sensor module 220a estimates the pressure across the filter 150 from a single pressure sensor 126.

In one embodiment, the second sensor module 220b is an oxygen content sensor that determines an oxygen content within the filter 150. In one embodiment, the second sensor module 220b is the oxygen sensor 162 of FIG. 1 and measures the oxygen content. In an alternate embodiment, the second sensor module 220b estimates the oxygen content from one or more related parameters such as fuel consumption and/or engine speed.

The temperature ramp module 210 is configured to calculate a regeneration cycle thermal ramp for regenerating the filter 150. The output module 215 may be configured to control one or more devices such as the regeneration device 230. In one embodiment, the regeneration device 230 comprises the reactant pump 170, reactant delivery mechanism 190, exhaust gas system valve 128, and exhaust bypass 132 of FIG. 1. In a certain embodiment, the output module 215 controls the regeneration device 230 in response to directives from the temperature ramp module 210.

In a certain embodiment, the temperature ramp module 210 specifies the introduction rate of reactant to the exhaust gas. Specifying the reactant introduction rate may determine the regeneration temperature rate for the filter 150. Thus the temperature ramp module 210 may modify the regeneration cycle thermal rate to prevent damage to the filter 150.

Figure 3:
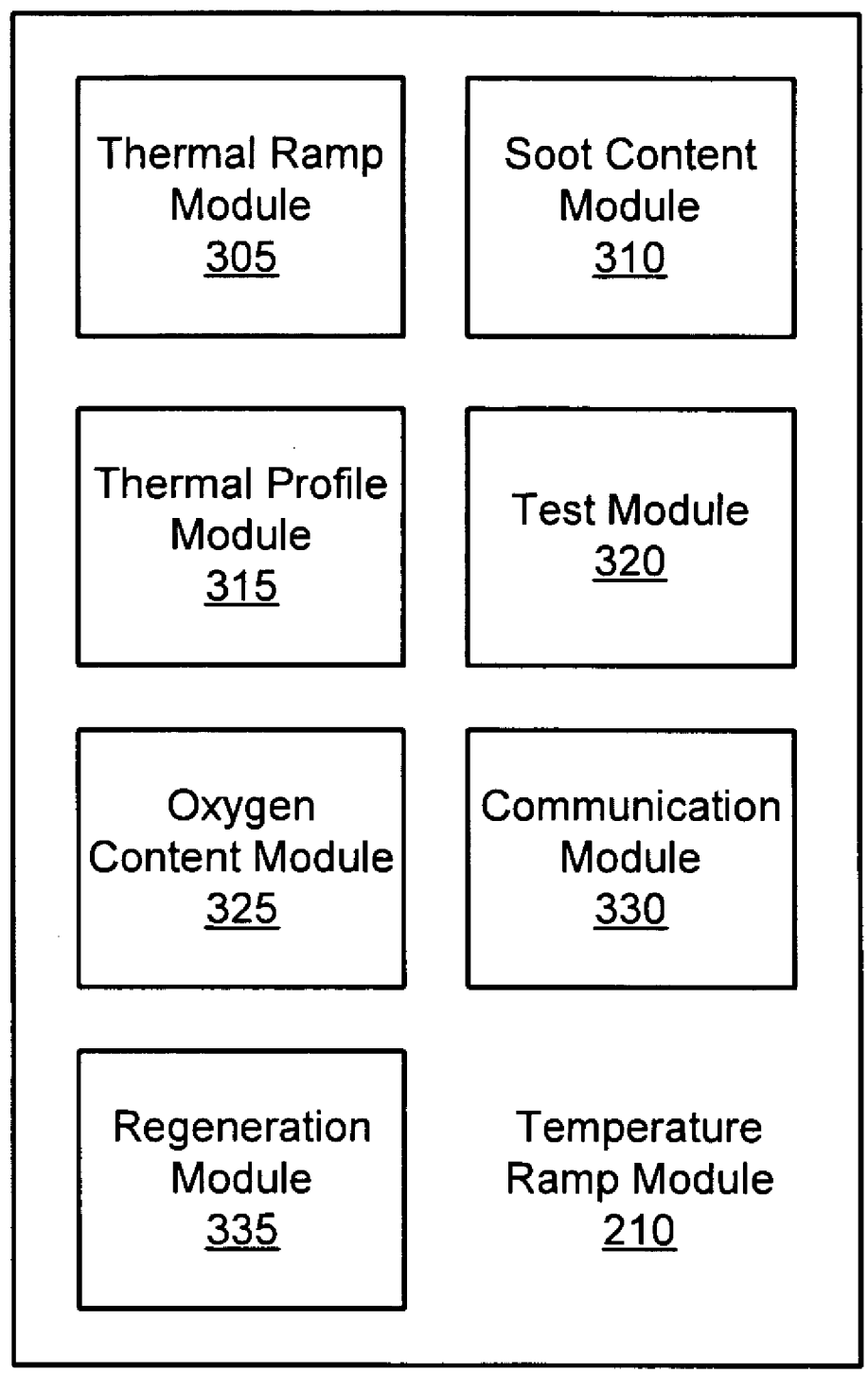
FIG. 3 is a schematic block diagram illustrating one embodiment of a temperature ramp module of the present invention.

FIG. 3 is a schematic block diagram illustrating one embodiment of a temperature ramp module 210 of the present embodiment. The temperature ramp module 210 may be the temperature ramp module 210 of FIG. 2. As depicted, the temperature ramp module 210 includes a thermal ramp module 305, soot content module 310, thermal profile module 315, test module 320, oxygen content module 325, communication module 330, and regeneration module 335. In addition, FIG. 3 may refer to the elements of FIGS. 1-2, like numbers referring to like elements.

The thermal ramp module 305 estimates a regeneration cycle thermal ramp. In one embodiment, the thermal ramp module 305 estimates a predetermined regeneration cycle thermal ramp. For example, the thermal ramp module 305 may comprise a regeneration cycle thermal ramp with values calibrated to avoid a thermal runaway in a filter 150 with a typical soot load.

In an alternate embodiment, the thermal ramp module 305 estimates the regeneration cycle thermal ramp as equivalent to a stored regeneration cycle thermal ramp. For example, on a previous instance the test module 320 may modify the regeneration cycle thermal ramp to form a first regeneration cycle thermal ramp during a first regeneration cycle. The thermal ramp module 305 may store the first regeneration cycle thermal ramp as the stored regeneration cycle thermal ramp. During a subsequent second regeneration cycle, the thermal ramp module 305 may estimate the regeneration cycle thermal ramp as substantially equivalent to the stored regeneration cycle thermal ramp.

The soot content module 310 estimates a soot content for the filter 150. In one embodiment, the soot content module 310 estimates the soot content as a function of one or more engine parameters. For example, the soot content module 310 may estimate the soot content as a fuel consumption multiplied by a constant. In a certain embodiment, the soot content module 310 estimates the soot content from a previous regeneration cycle. For example, the soot content module 310 may determine the soot content of the filter is a specified initial value such as one gram (1 g) subsequent to the first regeneration cycle and estimate added soot from the first regeneration cycle.

In one embodiment, the oxygen content module 325 estimates an oxygen content for the filter 150. In a certain embodiment, the oxygen content module 325 estimates the oxygen content from one or more engine 110 parameters.

The thermal profile module 315 calculates a thermal profile for the filter 150 as a function of the soot content and the thermal ramp. In a certain embodiment, the thermal profile module 315 calculates the thermal profile as a function of the soot content, the thermal ramp, and the oxygen content. The thermal profile may be configured in the form of a heat evolution rate measured as energy per unit of time such as kilojoules per minute (kJ/min) or kilocalories per minute (kc/min). Alternatively, the thermal profile may be configured in the form of a soot oxidation rate measured in soot oxidized per unit of time such as grams of soot oxidized per liter of filter per minute (g/l/min).

The test module 320 modifies the regeneration cycle thermal ramp if the thermal profile exceeds a thermal threshold. For example, if the thermal threshold is configured as a soot oxidation rate of 0.5 grams of soot oxidized per liter of filter per minute (0.5 g/l/min), and the thermal profile module is calculated as exceeding 0.6 g/l/min during the regeneration cycle, the test module 320 modifies the regeneration cycle thermal ramp to reduce the thermal profile.

In one embodiment, the communication module 330 communicates a warning if the thermal ramp exceeds the warning thermal threshold. The warning may comprise a warning light communicated to an operator. In addition, the warning may comprise an audible alarm communicated to the operator. The warning may also comprise an electronic message communicated to a controller 130 such as the controller of FIGS. 1 and 2.

In one embodiment, the regeneration module 335 directs the regeneration of the filter 150. The regeneration module 335 may direct the output module 215 of FIG. 2 to command the regeneration device 225 of FIG. 2 to regenerate the filter 150. The apparatus 300 determines a regeneration cycle thermal ramp that may avoid thermal runaway.

Figure 4:
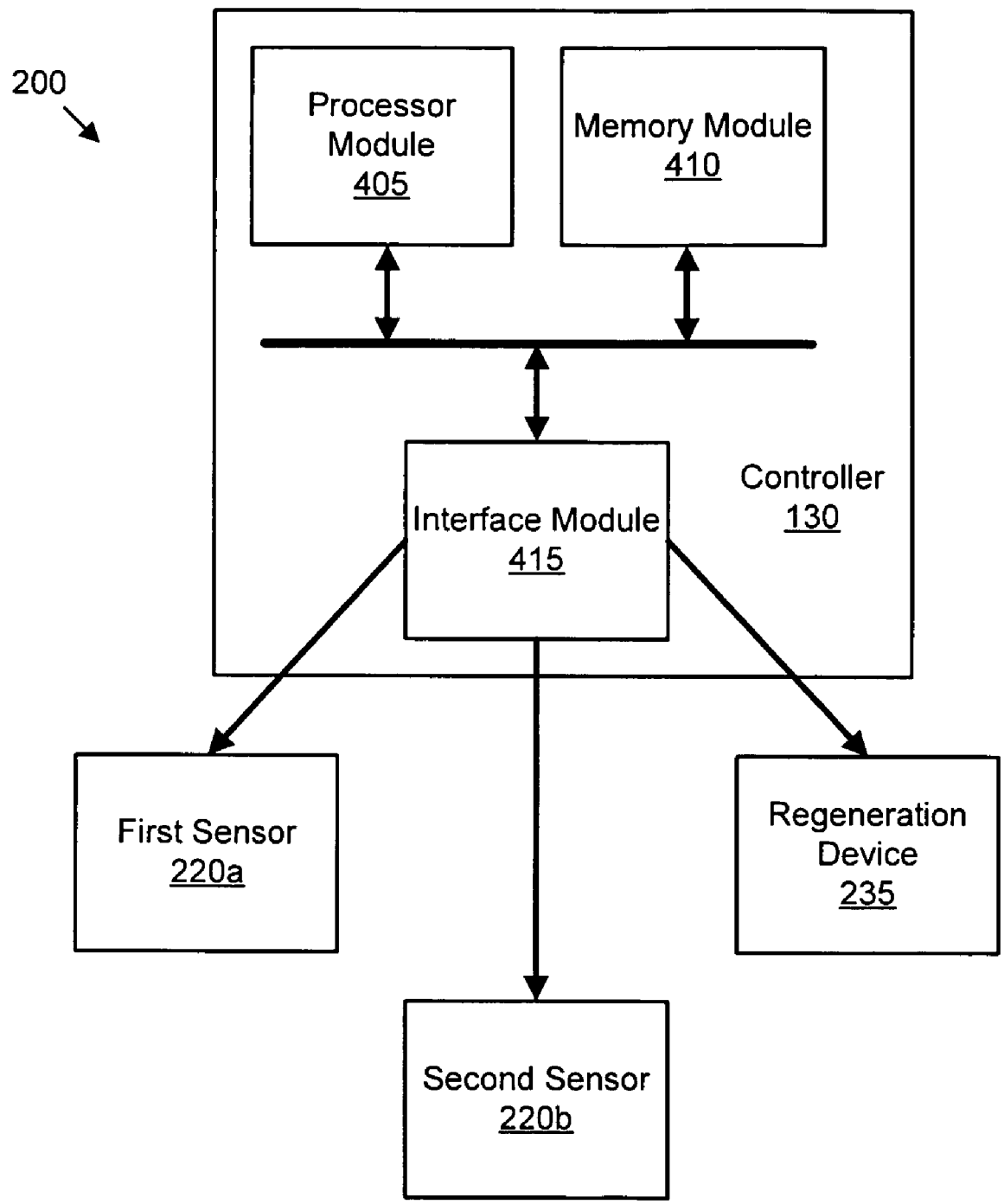
FIG. 4 is a schematic block diagram illustrating an alternate embodiment of a control system of the present invention.

FIG. 4 is a schematic block diagram illustrating another embodiment of the control system 200 of FIG. 2. The controller 130 is depicted as comprising a processor module 405, memory module 410, and interface module 415. The processor module 405, memory module 410, and interface module 415 may be fabricated of semiconductor gates on one or more semiconductor substrates. Each semiconductor substrate may be packaged in one or more semiconductor devices mounted on circuit cards. Connections between the processor module 405, the memory module 410, and the interface module 415 may be through semiconductor metal layers, substrate to substrate wiring, or circuit card traces or wires connecting the semiconductor devices.

The memory module 410 stores software instructions and data comprising one or more software processes. The processor module 405 executes the software processes as is well known to those skilled in the art. In one embodiment, the processor module 405 executes one or more software processes embodying the thermal ramp module 305, soot content module 310, thermal profile module 315, test module 320, oxygen content module 325, communication module 330, and regeneration module 335 of FIG. 3.

The processor module 405 may communicate with external devices and sensors such as the first and second sensor 220 and the regeneration device 225 of FIG. 2 through the interface module 415. For example, the first sensor module 220a may be a pressure sensor 126 such as a pressure sensor 126 of FIG. 1. The first sensor module 220a may communicate an analog signal representing a pressure value to the interface module 415. The interface module 415 may periodically convert the analog signal to a digital value and communicate the digital value to the processor module 405.

The interface module 215 may also receive one or more digital signals through a dedicated digital interface, a serial digital bus communicating a plurality of digital values, or the like. For example, the second sensor module 220b may be the oxygen sensor 162 of FIG. 1 and communicate a digital oxygen content value to the interface module 215. The interface module 215 may periodically communicate the digital oxygen content value to the processor module 405.

The processor module 405 may store digital values such as the pressure value and the oxygen content value in the memory module 410. In addition, the processor module 405 may employ the digital values in one or more calculations including calculations embodied by the thermal ramp module 305, soot content module 310, thermal profile module 315, test module 320, oxygen content module 325, and communication module 330. The processor module 405 may also control one or more devices such as the regeneration device 225 through the interface module 215.

Figure 5:
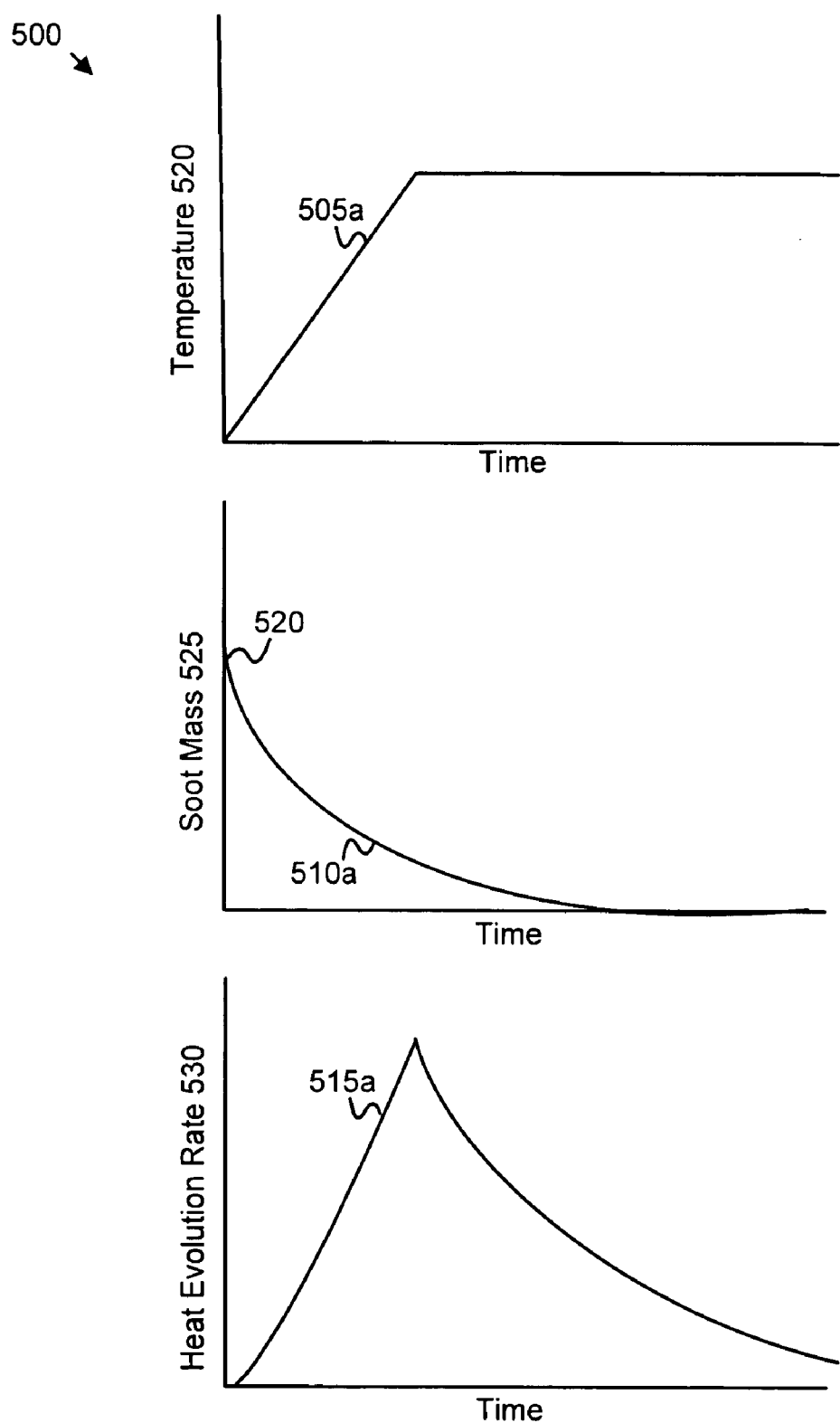
FIG. 5 is a graph illustrating one embodiment of a regeneration cycle thermal ramp, soot content, and thermal profile of the present invention.

FIG. 5 is graph 500 illustrating one embodiment of a regeneration cycle thermal ramp 505, soot content 510, and thermal profile 515 of the present invention. FIG. 5 also refers to elements of FIGS. 1-4, like numbers referring to like elements. A first regeneration cycle thermal ramp 505a, first soot content 510a, and first thermal profile 515a for a filter 150 are depicted over a regeneration cycle.

In one embodiment, the first regeneration cycle thermal ramp 505a is measured in the form of a temperature 520 within the filter 150. For example, each point on a depicted first regeneration cycle thermal ramp 505a may represent the temperature 520 within the filter at an instance of time such as 250° Celsius (250° C.) after three seconds (3 s) of regeneration. The first regeneration cycle ramp 505a may also be measured in the form of a reactant introduction rate. For example, the first regeneration cycle thermal ramp 505a may represent a rate of reactant introduction at the instance of time such as 5 milliliters of reactant per second (5 ml/s). The thermal ramp module 305 determines the first regeneration cycle thermal ramp 505a.

The soot content 510 depicts the soot mass 525 in the filter 150 during the regeneration cycle. The filter 150 may begin the regeneration cycle with an initial soot content 520. The soot content module 310 estimates the initial soot content 520. The introduction of reactant into the filter raises the temperature of within the filter 150 and oxidizes soot resulting in a decline in a depicted first soot content 510a during the regeneration cycle.

The thermal profile module 315 calculates a first thermal profile 515a as a function of the first regeneration cycle thermal ramp 505a and the first soot content 510a. For example, the thermal profile module 315 may calculate an instance of the first thermal profile 515a for each corresponding instance of the first regeneration cycle thermal ramp 505a and the first soot content 510a. In one embodiment, the thermal profile module 315 iteratively calculates the first thermal profile 515a from the initial soot content 520. As depicted the first thermal profile 515a increases with the first regeneration cycle thermal ramp 505a, then declines as the first regeneration cycle thermal ramp 505a remains constant while the first soot content 510a declines. The first thermal profile 515a is depicted measured as a heat evolution rate 530. The first thermal profile 515a may also be measured as a soot oxidation rate.

Figure 6:
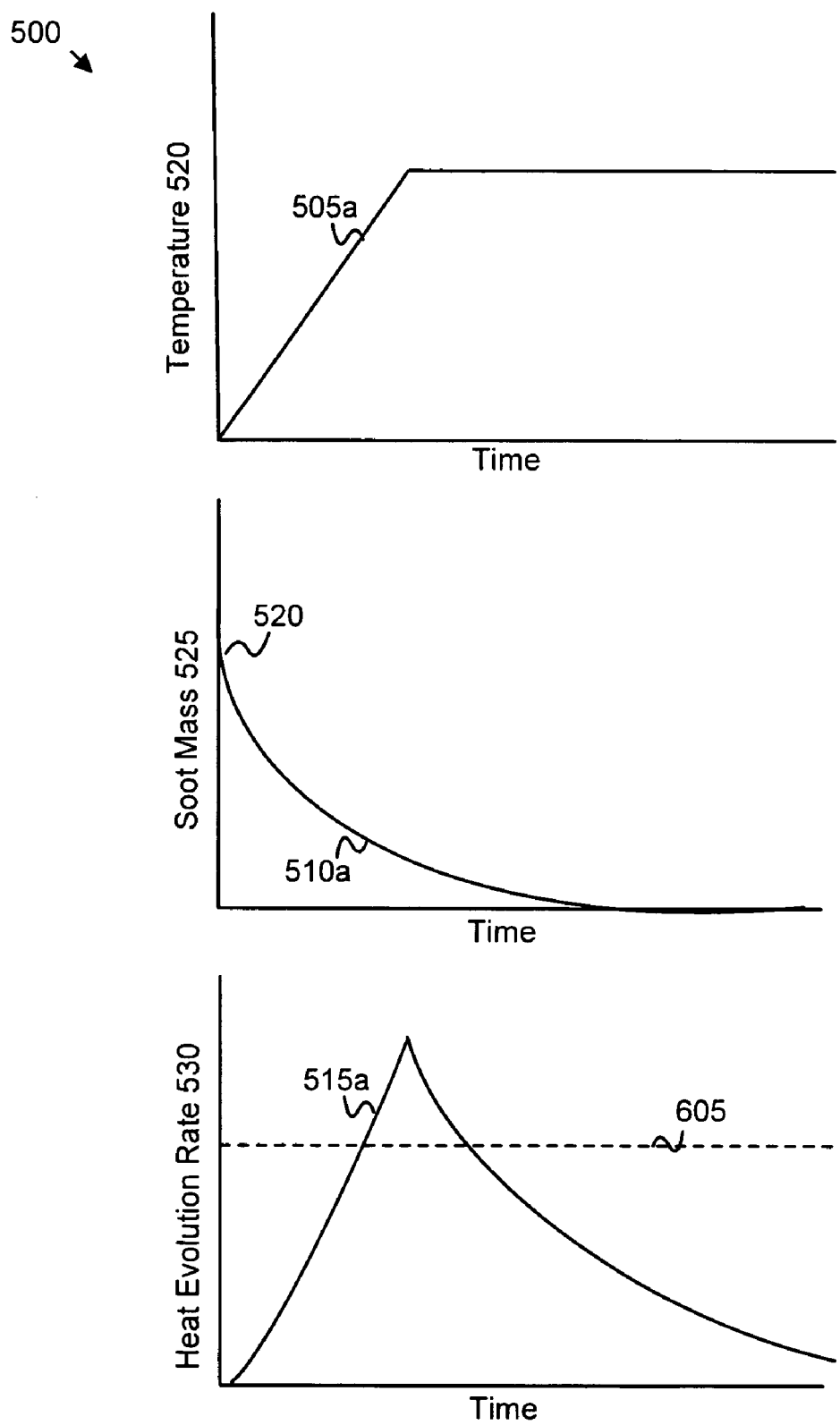
FIG. 6 is a graph illustrating one embodiment of a regeneration cycle thermal ramp, soot content, thermal profile, and thermal limit of the present invention.

FIG. 6 is a graph 500 illustrating one embodiment of a regeneration cycle thermal ramp 505, soot content 510, thermal profile 515, and thermal threshold 605 of the present invention. The graph 500 of FIG. 5 is depicted with a thermal threshold 605 for the thermal profile 515. FIG. 6 also refers to elements of FIGS. 1-4, like numbers referring to like elements. The thermal threshold 605 is defined in the units of the thermal profile 515. For example, if the thermal profile 515 is in the form of a heat evolution rate 530 and measured in kilojoules per minute (kJ/min), the thermal threshold 605 is also defined in kilojoules per minute (kJ/min).

In one embodiment, the thermal threshold 605 represents soot oxidation that that will damage the filter 150. For example, the filter 150 may be unable to dissipate the heat from the oxidation of the reactant and the soot sufficiently fast. As a result a substrate of the filter 150 may melt.

Figure 7:
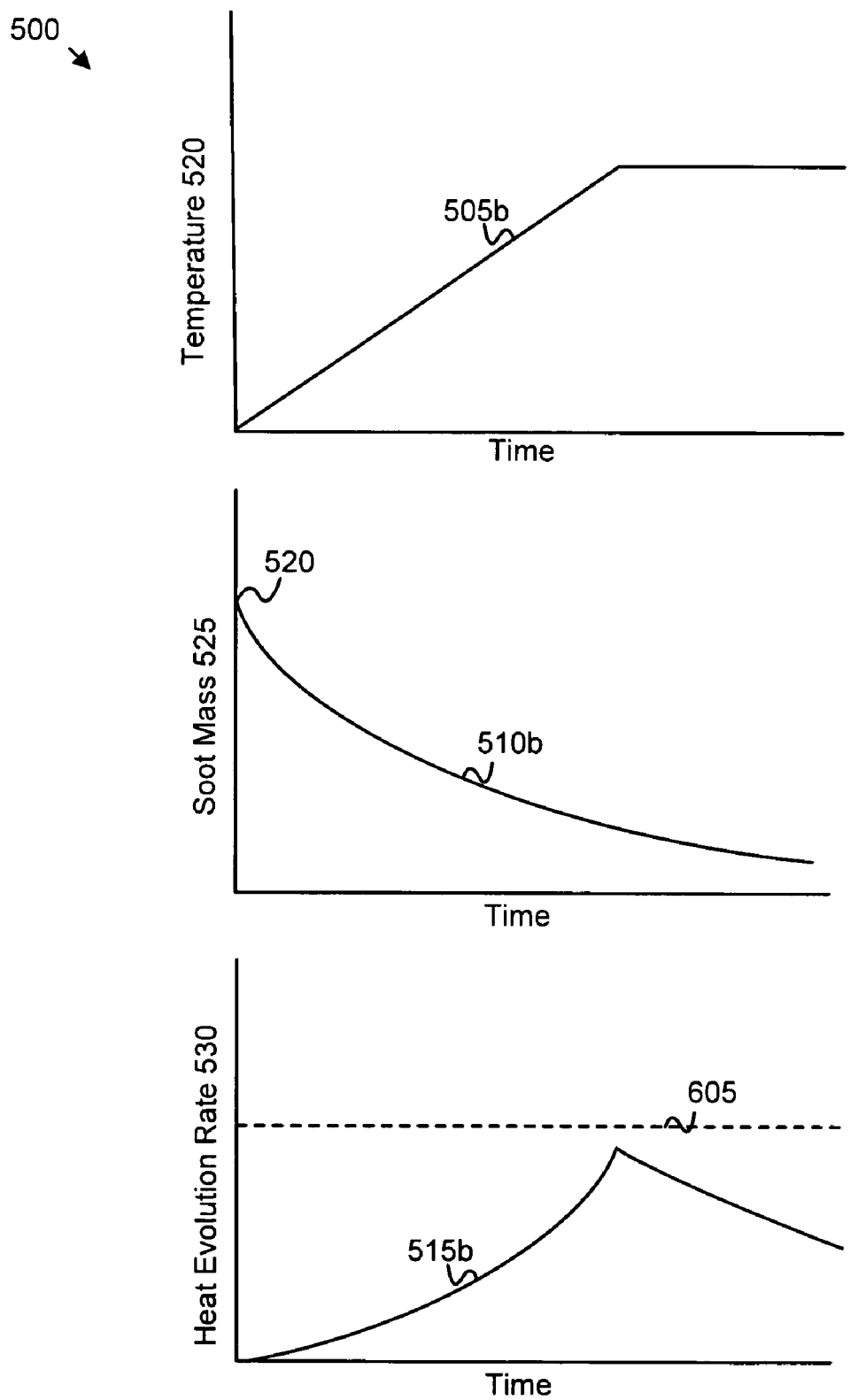
FIG. 7 is a graph illustrating an alternate embodiment of a regeneration cycle thermal ramp, soot content, thermal profile, and thermal limit of the present invention.

FIG. 7 is a graph 500 illustrating an alternate embodiment of a regeneration cycle thermal ramp 505, soot content 510, thermal profile 515, and thermal limit 605 of the present invention. The graph 500 of FIGS. 5-6 is depicted for a second regeneration cycle thermal ramp 505b. FIG. 7 also refers to elements of FIGS. 1-4.

As depicted, a second regeneration cycle thermal ramp 505b increases more slowly than the first regeneration cycle thermal ramp 505a of FIGS. 5 and 6. As a result, the a second soot content 510b is oxidized at a slower rate, resulting in a slower increase in a second thermal profile 515b calculated for the second regeneration cycle thermal ramp 505b and the second soot content 510b such that the second thermal profile 515b does not exceed the thermal threshold 605.

Figure 8:
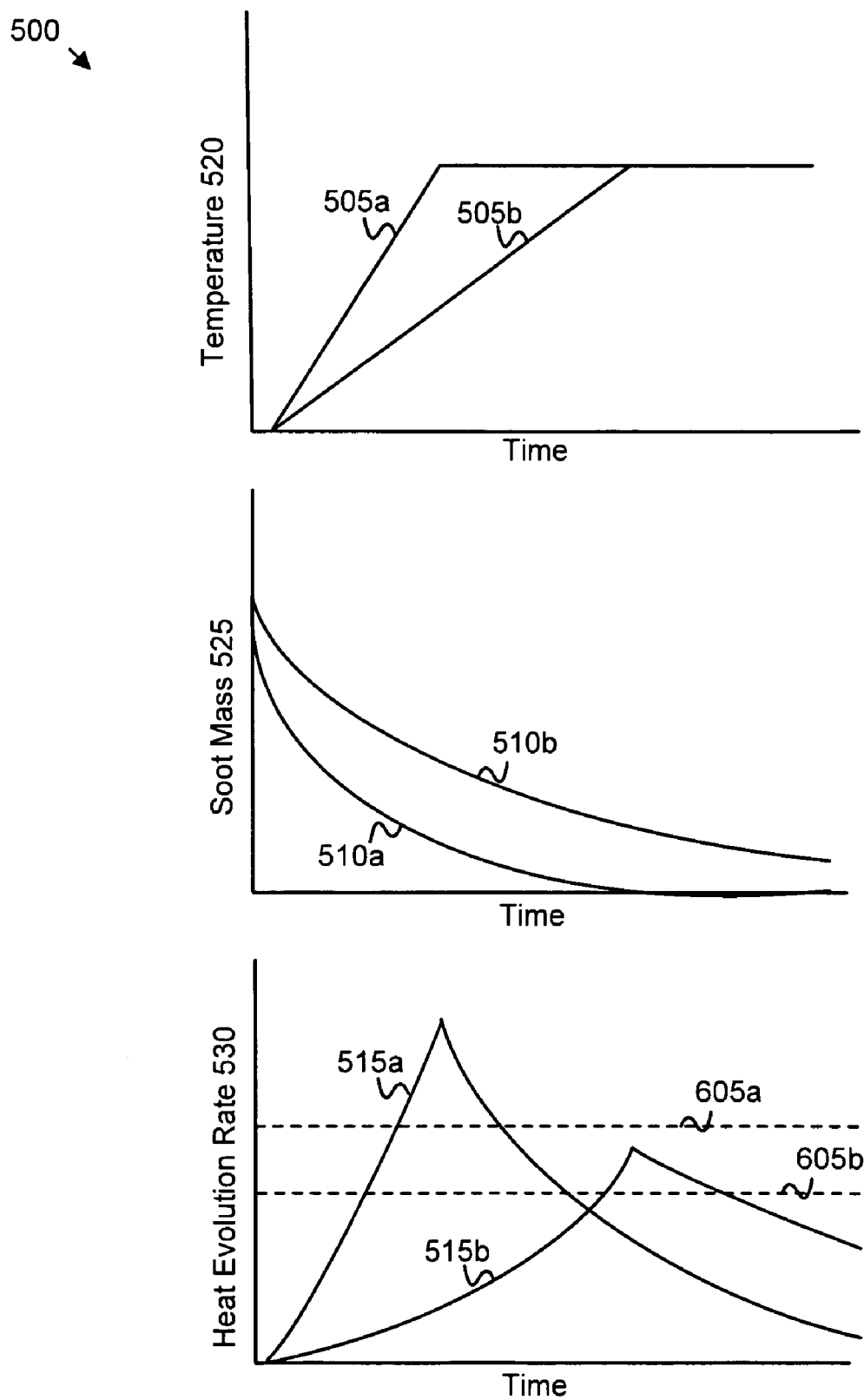
FIG. 8 is a graph illustrating one embodiment of thermal ramp modification of the present invention.

FIG. 8 is a graph illustrating one embodiment of thermal ramp modification of the present invention. The graph 500 of FIGS. 5-7 is depicted for the first and second regeneration cycle thermal ramp 505a, 505b. FIG. 8 also refers to elements of FIGS. 1-4. The first regeneration cycle thermal ramp 505a results in the first thermal profile 515a exceeding the thermal threshold 605. As a result, the test module 320 of FIG. 3 modifies the first regeneration cycle thermal ramp 505a to the second regeneration cycle thermal ramp 505b. The thermal profile module 315 calculates that the second soot content 510b is oxidized more slowly, resulting in the second thermal profile 515b not exceeding the thermal threshold 605. Therefore, the filter 150 may be protected from damage from excessive heat by employing the second regeneration cycle thermal ramp 505b.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
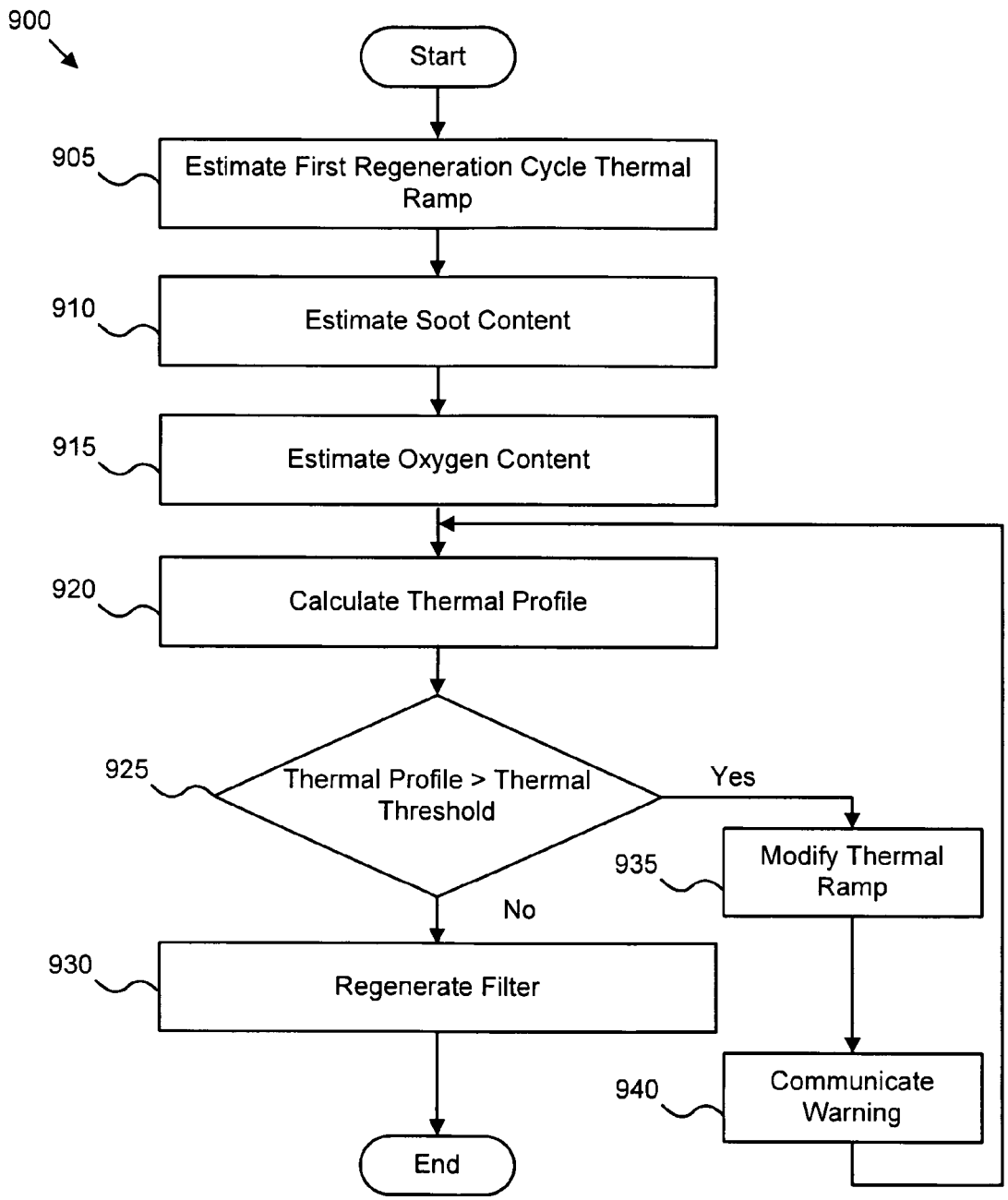
FIG. 9 is a schematic flow chart diagram illustrating one embodiment of a thermal ramp determination method of the present invention.

FIG. 9 is a schematic flow chart diagram illustrating one embodiment of a thermal ramp determination method 900 of the present invention. The method 900 substantially includes the steps necessary to carry out the functions presented above with respect to the operation of the described modules 300 and systems 100, 200, 400 of FIGS. 1-4. FIG. 9 also refers to elements of FIGS. 1-8, like numbers referring to like elements.

The method 900 begins and a thermal ramp module 305 estimates 905 a regeneration cycle thermal ramp 505 such as a first regeneration cycle thermal ramp 505a. In one embodiment, the thermal ramp module 305 estimates 905 the regeneration cycle thermal ramp 505 as a predetermined regeneration cycle thermal ramp 505. For example, a first regeneration cycle thermal ramp 505a for a typical regeneration cycle may be determined experimentally and programmed as one or more data values in a memory module 410.

In a certain embodiment, the thermal ramp module 305 estimates 905 the regeneration cycle thermal ramp 505 as a reactant introduction rate for a filter 150. The thermal ramp module 305 may also estimate 905 the regeneration cycle thermal ramp 505 as a temperature ramp for the filter 150.

A soot content module 310 estimates 910 a soot content 510 for a filter 150. In one embodiment, the soot content module 310 estimates 910 the soot content 510 as a function of engine 110 operation time. In a certain embodiment, the soot content module 310 resets the soot content 510 to a specified initial value such as zero (0) subsequent to each regeneration cycle.

In one embodiment, an oxygen content module 325 estimates 915 an oxygen content for the filter 150. The oxygen content module 325 may estimate 915 the oxygen content from one or more engine parameters. For example, the oxygen content module 325 may estimate 915 the oxygen content from the pressure sensor 126 and the fuel consumption of an engine 110. In an alternate embodiment, the oxygen content module 325 may measure the oxygen content using a sensor 220 such as an oxygen sensor 162.

A thermal profile module 315 calculates 920 a thermal profile 515 for the filter 150. In one embodiment, the thermal profile module 315 calculates 920 the thermal profile 515 as a function of the soot content 510 and the regeneration cycle thermal ramp 505. The thermal profile module 315 may also include the oxygen content in the thermal profile calculation. In one embodiment the thermal profile module 315 calculates 920 the thermal profile 515r using Equation 1, where c is the soot content, x is the oxygen content, no is a constant, A is a constant, b is a constant, $E_A$ is an activation energy, and T is the temperature.

$$r = c^{nc} x^{no} A e^{\left(\frac{EA}{bT}\right)}$$ Equation 1

In one embodiment, nc is in the range of 0 to 2.0. In addition, no may be in the range of 0 to 2.0. The value and units of A depend on the selected units for the r, c and x, and on the values of nc and no. In a certain embodiment, A is in the range of $1.0*10^{-3}$ to $1.0*10^{-9}$. The constant b may be 8.314, while $E_A$ is in the range of $9.0*10^4$ to $2.0*10^6$ kilojoules per mole (kJ/mol). In an alternate embodiment, the thermal profile module 315 calculates 920 the thermal profile 515 using measurements selected from a molecular oxygen exhaust gas species measurement, a nitric oxide exhaust gas species measurement, a nitrogen dioxide exhaust gas species measurement, a carbon dioxide exhaust gas species measurement, a water measurement, a hydrocarbon exhaust gas species measurement, a filter exhaust gas temperature measurement, a filter temperature distribution measurement, and an exhaust gas flow rate measurement A test module 320 determines 925 if the thermal profile 515 exceeds a thermal threshold 605. If the test module 320 determines 925 the first thermal profile 515 exceeds the thermal threshold 605, the test module 320 modifies 935 the first regeneration cycle thermal ramp 505a such as to form a second regeneration cycle thermal ramp 505b. In one embodiment, a communication module 330 communicates 940 a warning if the thermal profile 515 exceeds a warning threshold. The warning threshold may be the thermal threshold 605. The thermal profile module 315 calculates 920 a second thermal profile 515b for the filter 150 as a function of the second soot content 510b and the second regeneration cycle thermal ramp 505b.

If the test module 320 determines 925 the thermal profile 515 does not exceed the thermal threshold 605, a regeneration module 335 regenerates 930 the filter 150 and the method 900 terminates. In one embodiment, the regeneration module 335 directs the output module 215 of FIG. 2 to command the regeneration device 225 of FIG. 2 to regenerate the filter 150.

The embodiment of the present invention determines a regeneration cycle thermal ramp 505 for a filter 150. In addition, the embodiment of the present invention may modify 935 the regeneration cycle thermal ramp 505 to prevent damage to the filter 150 during regeneration from thermal runaway.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to determine a regeneration cycle thermal ramp, the apparatus comprising:
   a thermal ramp module configured to estimate a regeneration cycle thermal ramp;
   a soot content module configured to estimate a soot content for a filter;
   a thermal profile module configured to calculate a thermal profile for the filter as a function of the soot content and the thermal ramp; and
   a test module configured to modify the regeneration cycle thermal ramp if the thermal profile exceeds a thermal threshold.

2. The apparatus of claim 1, wherein the thermal profile and thermal threshold are configured in the form of heat evolution rates.

3. The apparatus of claim 1, wherein the thermal profile and thermal threshold are configured in the form of soot oxidation rates.

4. The apparatus of claim 1, further comprising an oxygen content module configured to estimate an oxygen content and wherein the thermal profile module calculation comprises the oxygen content.

5. A system to determine a regeneration cycle thermal ramp, the system comprising:
   a filter configured to remove particulates from an exhaust gas flow;
   a controller comprising
      a thermal ramp module configured to estimate a regeneration cycle thermal ramp for the filter;
      a soot content module configured to estimate a soot content for the filter;
      a thermal profile module configured to calculate a thermal profile for the filter as a function of the soot content and the thermal ramp;

a test module configured to modify the regeneration cycle thermal ramp if the thermal profile exceeds a thermal threshold; and a communication module configured to communicate a warning if the thermal ramp exceeds a warning thermal threshold, wherein the warning is selected from a warning light communicated to an operator, an audible alarm communicated to the operator, and an electronic message communicated to a controller.

6. The system of claim 5, further comprising an oxygen content module configured to estimate an oxygen content and wherein the thermal profile module calculation comprises the oxygen content.

7. A method for determining a regeneration cycle thermal ramp, the method comprising:
estimating a regeneration cycle thermal ramp;
estimating a soot content for a filter;
calculating a thermal profile for the filter as a function of the soot content and the thermal ramp; and
modifying the regeneration cycle thermal ramp if the thermal profile exceeds a thermal threshold.

8. The method of claim 7, wherein the thermal profile and thermal threshold are configured in the form of heat evolution rates.

9. The method of claim 7 wherein the thermal profile and thermal threshold are configured in the form of soot oxidation rates.

10. The method of claim 7 further comprising estimating an oxygen content and wherein the thermal profile calculation comprises the oxygen content.

11. The method of claim 10, wherein the thermal profile soot oxidation rate r is calculates as $$r = c^{nc} x^{no} A e^{\left(\frac{EA}{bT}\right)}$$

where c is the soot content, nc is a constant, x is the oxygen content, no is a constant, A is a constant, b is a constant, EA is an activation energy, and T is the temperature.

12. The method of claim 11, where nc is in the range of 0 to 2.0, no is in the range of 0 to 2.0, b is 8.314, and EA is in the range of $9.0*10^4$ to $2.0*10^6$ kJ/mol and wherein the value and units of A depend on the selected units for the r, c, and x, and on the values of nc and no.

13. The method of claim 10, wherein the thermal profile of soot oxidation is determined using measurements or estimations selected from a molecular oxygen exhaust gas measurement, a nitric oxide exhaust gas measurement, a nitrogen dioxide exhaust gas measurement, a carbon dioxide exhaust gas measurement, a water measurement, a hydrocarbon exhaust gas species measurement, a filter soot amount measurement or estimation, a filter inlet exhaust gas temperature measurement, a filter outlet exhaust gas temperature measurement, a filter temperature distribution measurement, and an exhaust gas flow rate measurement.

14. The method of claim 7, further comprising a plurality of thermal thresholds each initiating a different thermal ramp modification strategy.

15. The method of claim 14, further comprising communicating a warning if the thermal ramp exceeds a warning thermal threshold, wherein the warning is selected from a warning light communicated to an operator, an audible alarm communicated to the operator, and an electronic message communicated to a controller.

16. The method of claim 7, wherein the ramp rate is continuously adjusted in response to a sensor configured to monitor filter conditions, the sensor selected from a physical sensor and a virtual sensor.

17. A signal bearing medium tangibly embodying a program of machine-readable instructions executable by a processing apparatus to perform an operation to determine a regeneration cycle thermal ramp, the operation comprising:
estimating a regeneration cycle thermal ramp;
estimating a soot content for a filter;
estimating an oxygen content for the filter;
calculating a thermal profile for the filter as a function of the soot content, the thermal ramp, and the oxygen content; and
modifying the regeneration cycle thermal ramp if the thermal profile exceeds a thermal threshold.

18. The signal bearing medium of claim 17, wherein the thermal profile soot oxidation rate r is calculates as $$r = c^{nc} x^{no} A e^{\left(\frac{EA}{bT}\right)}$$

where c is the soot content, nc is a constant in the range of 0 to 2.0, x is the oxygen content, no is a constant in the range of 0 to 2.0, b is a 8.314, EA is an activation energy in the range of $9.0*10^4$ to $2.0*10^6$ kJ/mol, and T is the temperature and wherein the value and units of A depend on the selected units for the r, c, and x, and on the values of nc and no.

19. The system of claim 6, further comprising a diesel engine and exhaust gas after-treatment system.

20. The method of claim 7, where the thermal ramp is comprised of a plurality of segments whose segment ramp rate is selected from positive, zero, and negative rates.

* * * * *